June 3, 1930.  J. V. SCHAFER  1,761,750
REEL
Filed Aug. 8, 1928
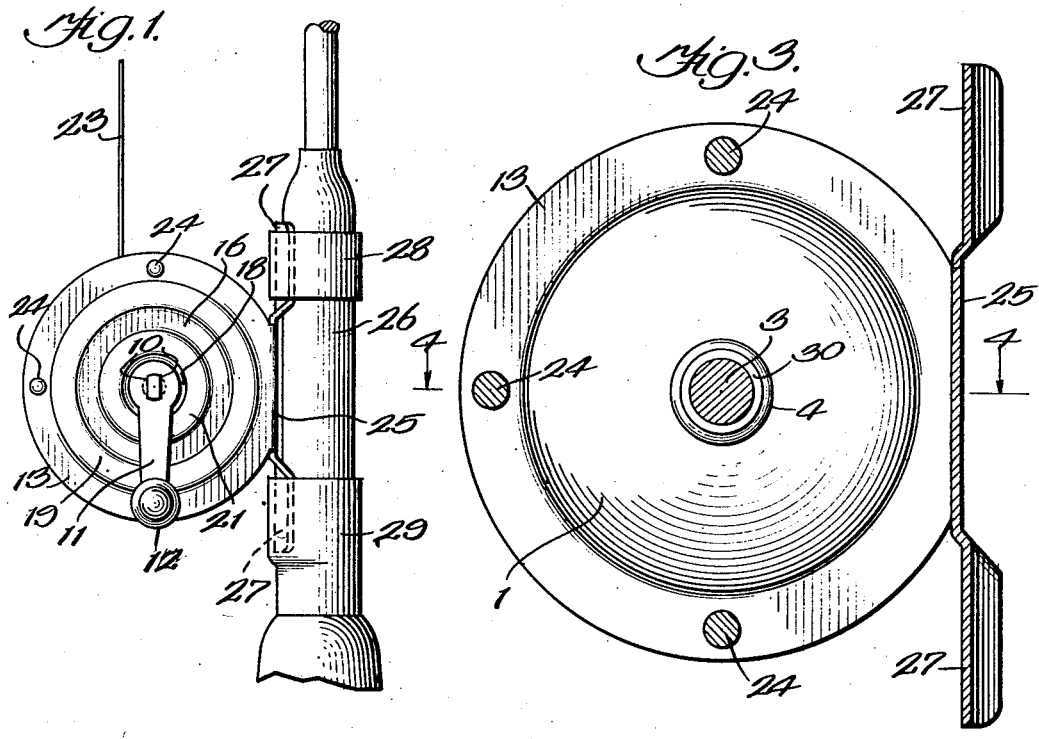
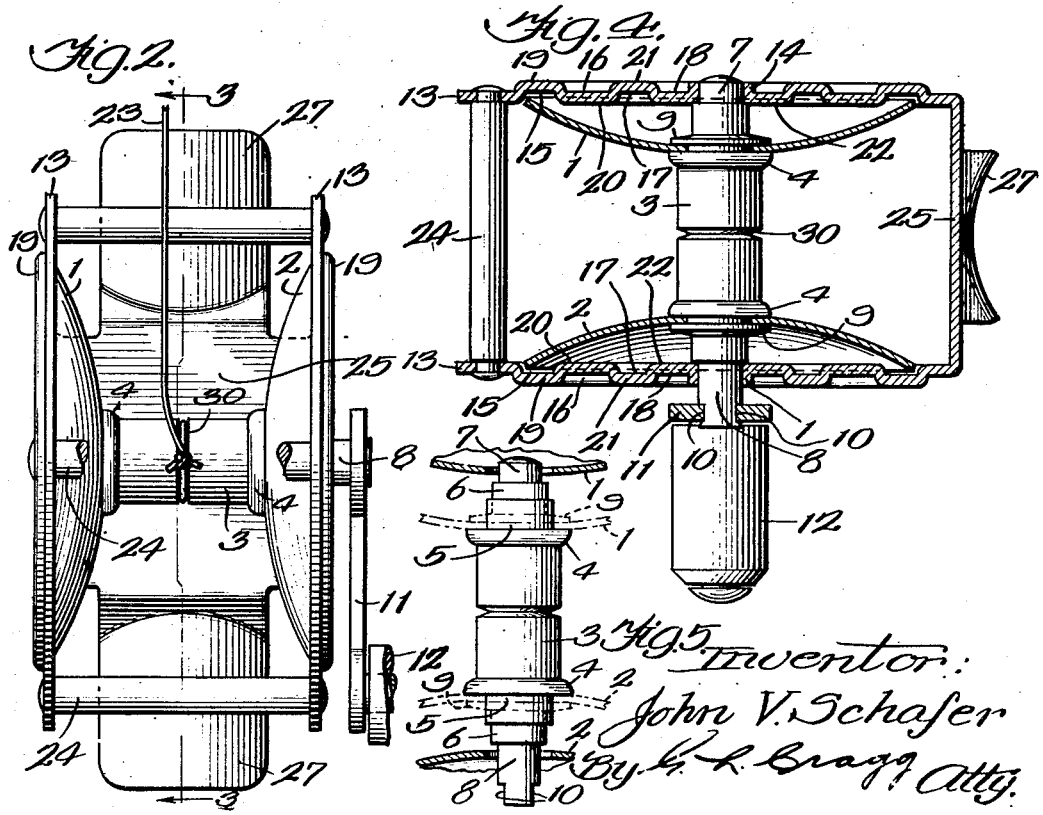
Inventor:
John V. Schafer Patented June 3, 1930

1,761,750

UNITED STATES PATENT OFFICE

JOHN V. SCHAFER, OF BRONSON, MICHIGAN, ASSIGNOR TO BRONSON REEL COMPANY, OF BRONSON, MICHIGAN, A CORPORATION OF MICHIGAN

REEL

Application filed August 8, 1928. Serial No. 298,288.

My invention relates to reel structures and has for its general object the simplification and cheapening of the construction thereof while maintaining desired strength.

A reel structure made in accordance with the preferred embodiment of one characteristic of the invention includes the winding spool thereof and a one-piece U-shaped member upon and between whose sides the winding spool is mounted to turn. In the preferred embodiment of the invention, the U-shaped member is formed of sheet material, preferably metal. The sides of the U-shaped member have coaxial sleeves pressed therefrom which constitute bearings for the ends of the shaft that constitute journals whereby the spool may be rotatively mounted. Each of said U-shaped member sides has concentric annular grooves of differing diameters pressed therein and whose centers lie substantially in the common axis of said sleeves and which grooves are alternately located in the opposite faces of such U-shaped member side. The differing diameters of said grooves are such as to form concentric annular ribs of differing diameters which are alternately located upon opposite faces of each U-shaped member side having such grooves. The periphery of each spool head extends into one of the grooves formed in the adjacent face of the adjacent U-shaped member side. A mounting ear formation is preferably employed that is made integral with the base of such member.

In accordance with another characteristic of the invention, the shaft of the winding spool is separately made and the heads of the spool are in the form of end plates which have their central portions penetrated by the journal ends of the shaft. The shaft has two flanges at each end plate between and by which such plate is clamped in position.

The invention will be more fully explained in connection with the accompanying drawing in which Fig. 1 is a side elevation illustrating the reel structure as it is preferably formed for holding a fishing line, the assembly of the reel structure with a fishing pole, of which a part is shown, being illustrated; Fig. 2 is a front elevation of the reel structure illustrated in Fig. 1, on a larger scale, the fishing pole being omitted; Fig. 3 is a sectional view on line 3—3 of Fig. 2; Fig. 4 is a sectional view on line 4—4 of Fig. 3; and Fig. 5 illustrates the manner in which the winding spool is preferably formed.

The circular winding spool is preferably formed of three parts comprising the plate heads 1, 2 and the shaft 3 which rotatively supports the spool and which defines, with the spool heads, the winding space. Said plate heads are preferably made of sheet metal and desirably have their outer faces concave. Said shaft is preferably formed of solid metal and is initially of the shape shown in full lines in Fig. 5, the shaft then having two flanges 4, reduced portions 5 which snugly pass through central holes in the spool heads, further reduced portions 6, and final reduced portions 7 and 8. In order to assemble the plate heads with the shaft, the heads are slipped onto the shaft reductions 5 and against the flanges 4 whereafter the parts 6 and the adjacent portions of the parts 5 are staked to form flanges 9, Fig. 4, upon the outer sides of the spool heads. The latter flanges are tightly pressed against the spool heads to press these heads tightly against the flanges 4 whereby said spool heads are clamped in position by the flanges between which they are disposed.

The outer faces of the spool heads are desirably concave. The outer shaft ends 7 and 8 constitute journals which are coaxial with the spool heads and project outwardly from and are in fixed connection with the central portions of the heads. The shaft end 8 has its extreme outer end flattened at its sides, as indicated at 10, this flattened portion being passed through the correspondingly shaped hole in the crank arm 11 and being riveted upon this crank arm as illustrated in Fig. 4. A handle 12 is provided upon the outer end of the arm 11.

A winding spool thus or otherwise constructed is rotatably supported upon a U-shaped member that is preferably formed of sheet metal and whose sides 13 have coaxial sleeves 14 pressed therefrom to constitute bearings for the journals 7 and 8. Each side 13 of said U-shaped member also has concentric annular grooves 15, 16, 17 and 18 of differing diameters pressed therein, the centers of these grooves lying substantially in the common axis of said sleeves. These grooves are alternately located in the opposite faces of the sides 13, the differing diameters of the grooves being such as to form concentric annular ribs 19, 20, 21 and 22 which are alternately located upon opposite faces of the aforesaid sides 13. The alternated grooves and ribs and the journal sleeves 14 serve to strengthen the sides of the U-shaped member, permitting such member to be made of very thin sheet metal. The peripheries of the circular spool heads enter the annular grooves 15 so as to prevent the cord or line 23, which is to be wound and unwound from the spool, from entering between the spool heads and the U-shaped member sides 13.

Bridging rods 24 are desirably employed between the sides 13, the ends of these rods being in riveted connection with these member sides. The base 25 of the U-shaped member desirably has an ear formation integrally made therewith for the purpose of mounting the reel structure upon a fishing rod 26 or other support. As illustrated, this ear formation is inclusive of two ears 27 which are arcuate in cross section to conform to the portion of the fishing pole to which they are to be applied and to the retaining rings 28, 29 between which and the fishing pole said ears are disposed.

A crack or recess 30 is formed in the central portion of the shaft 3 and extends in a circumferential direction, this crack desirably being annular and extending completely about the shaft. The fishing line 23 may be wedged in this crack and tied in place as illustrated in Fig. 2.

Changes may be made without departing from the invention.

Having thus described my invention, I claim:

1. In a reel structure, the combination with the winding spool thereof having circular heads whose outer faces are concave; of journals coaxial with said spool heads and projecting outwardly from and in fixed connection with the central portions of said heads; a U-shaped member formed of sheet material and whose sides have coaxial sleeves pressed therefrom which constitute bearings for said journals and each of which sides has concentric annular grooves of differing diameters pressed therein and whose centers lie substantially in the common axis of said sleeves and which grooves are alternately located in the opposite faces of such U-shaped member side and whose differing diameters are such as to form concentric annular ribs of differing diameters which are alternately located upon opposite faces of such U-shaped member side, the periphery of each of said spool heads extending into one of the grooves formed in the adjacent face of the adjacent U-shaped member side; and a mounting ear formation made integrally with the base of said U-shaped member.

2. In a reel structure, the combination with the winding spool thereof having circular heads whose outer faces are concave; of journals coaxial with said spool heads and projecting outwardly from and in fixed connection with the central portions of said heads; and a U-shaped member formed of sheet material and whose sides have coaxial sleeves pressed therefrom which constitute bearings for said journals and each of which sides has concentric annular grooves of differing diameters pressed therein and whose centers lie substantially in the common axis of said sleeves and which grooves are alternately located in the opposite faces of such U-shaped member side and whose differing diameters are such as to form concentric annular ribs of differing diameters which are alternately located upon opposite faces of such U-shaped member side, the periphery of each of said spool heads extending into one of the grooves formed in the adjacent face of the adjacent U-shaped member side.

3. In a reel structure, the combination with the winding spool thereof having circular heads whose outer faces are concave; of journals coaxial with said spool heads and projecting outwardly from and in fixed connection with the central portions of said heads; and a support having sides in which said journals have bearing, each of said sides having concentric annular grooves of differing diameters pressed therein and whose centers lie substantially in the common axis of said journals and which grooves are alternately located in the opposite faces of such side and whose differing diameters are such as to form concentric annular ribs of differing diameters which are alternately located upon opposite faces of such side, the periphery of each of said spool heads extending into one of the grooves formed in the adjacent face of the adjacent support side.

In witness whereof, I hereunto subscribe my name.

JOHN V. SCHAFER.